United States Patent
Katz

Patent Number: 5,943,661
Date of Patent: Aug. 24, 1999

[54] HYBRID NEURAL NETWORK CLASSIFIER, SYSTEMS AND METHODS

[75] Inventor: Alan Jerry Katz, Dallas, Tex.

[73] Assignee: Texas Instruments Incorporated, Dallas, Tex.

[21] Appl. No.: 07/728,426

[22] Filed: Jul. 11, 1991

[51] Int. Cl.⁶ ................................................. G06F 15/18
[52] U.S. Cl. ............................................. 706/16; 706/25
[58] Field of Search .................. 395/51, 22, 26, 395/24, 25, 23, 13, 934; 364/413.05; 706/15–18, 23–25

[56] References Cited

U.S. PATENT DOCUMENTS

| | | | |
|---|---|---|---|
| 4,804,250 | 2/1989 | Johnson | 395/25 |
| 4,881,178 | 11/1989 | Holland et al. | 395/51 |
| 4,933,872 | 6/1990 | Vandenberg et al. | 395/26 |
| 4,954,963 | 9/1990 | Penz et al. | 395/24 |
| 5,048,100 | 9/1991 | Kuperstein | 395/24 |
| 5,058,184 | 10/1991 | Fukushima | 395/22 |
| 5,092,343 | 3/1992 | Spitzer et al. | 364/413.05 |
| 5,119,469 | 6/1992 | Alkon et al. | 395/23 |
| 5,136,686 | 8/1992 | Koza | 395/13 |
| 5,155,801 | 10/1992 | Lincoln | 395/22 |
| 5,159,667 | 10/1992 | Borrey et al. | 395/934 |

*Primary Examiner*—Tariq R. Hafiz
*Attorney, Agent, or Firm*—Carlton H. Hoel; W. James Brady; Richard L. Donaldson

[57] ABSTRACT

A method of and system for parallelizing an program, comprising the steps of inputting an algorithm, operating said algorithm on selected data inputs to generate representative outputs, inputting representative outputs into parallelizing algorithms, and outputting a parallel implementation of said algorithm. In particular, this provides a parallel framework for target classification and pattern recognition procedures.

4 Claims, 4 Drawing Sheets

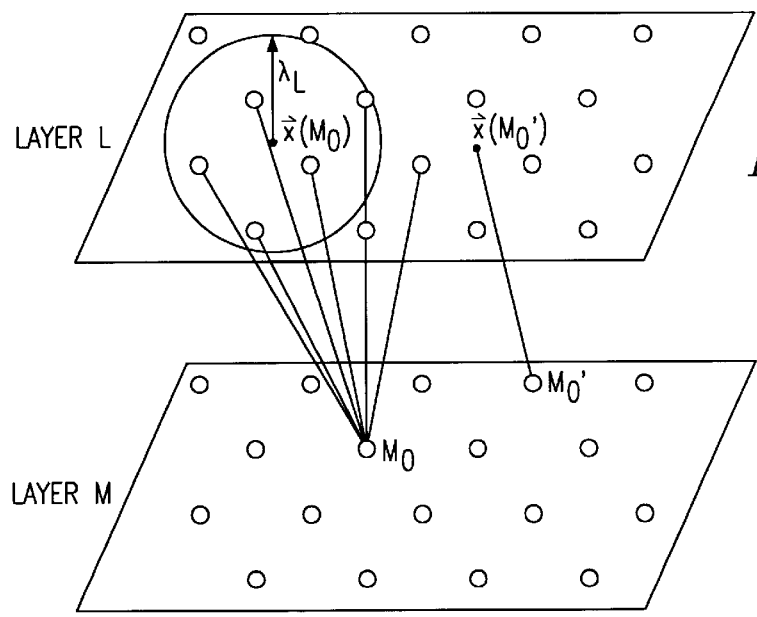

FIG. 4

| 1-CLASS CLASSIFIER | 2-CLASS CLASSIFIER |
|---|---|
| • PARZEN<br>• HYBRID PARZEN WITH INFOMAX<br>• HYBRID PARZEN WITH BACKPROPAGATION | • PARZEN |

FIG. 6

| IMAGE SET | NUMBER OF IMAGES | SCENE DESCRIPTION |
|---|---|---|
| 1 | 90 | MOSTLY FIELDS, SPARSE TREES, SPRING |
| 2 | 30 | HEAVILY FORESTED; TARGETS ALONG TREE LINES; SUMMER |

FIG. 7

| CLASSIFIER | TEST SET | $P_d$ (FOR TARGETS) | $P_{fa}$ (FOR CLUTTER) |
|---|---|---|---|
| 2-CLASS PARZEN | CLUTTER (#1)<br>TARGETS (#2)<br>CLUTTER (#2) | 1.0 | 0.31<br><br>0.78 |
| 2-CLASS MULTILAYER | CLUTTER (#1)<br>TARGETS (#2)<br>CLUTTER (#2) | 0.85 | 0.10<br><br>0.49 |

FIG. 9

| CLASSIFIER | TEST SET | $P_d$ (FOR TARGETS) | | $P_{fa}$ (FOR CLUTTER) | |
| --- | --- | --- | --- | --- | --- |
| 1-CLASS PARZEN | TARGETS (#1) | 0.82 (0.8) | 0.74 (0.7) | | |
| | CLUTTER (#1) | | | 0.14 (0.8) | 0.08 (0.7) |
| | TARGETS (#2) | 0.85 (0.8) | 0.82 (0.7) | | |
| | CLUTTER (#2) | | | 0.27 (0.8) | 0.15 (0.7) |
| 1-CLASS MULTILAYER | | | | | |
| 9x8x1 | TARGETS (#1) | | 0.78 (0.7) | | |
| | CLUTTER (#1) | | | | 0.19 (0.7) |
| | TARGETS (#2) | | 0.97 (0.7) | | |
| | CLUTTER (#2) | | | | 0.48 (0.7) |
| 9x16x1 | TARGETS (#1) | | 0.76 (0.7) | | |
| | CLUTTER (#1) | | | | 0.15 (0.7) |
| | TARGETS (#2) | | 0.95 (0.7) | | |
| | CLUTTER (#2) | | | | 0.43 (0.7) |
| 9x32x1 | TARGETS (#1) | | 0.79 (0.7) | | |
| | CLUTTER (#1) | | | | 0.17 (0.7) |
| | TARGETS (#2) | | 0.97 (0.7) | | |
| | CLUTTER (#2) | | | | 0.46 (0.7) |
| INFOMAX | | | | | |
| 2-CENTERS | TARGETS (#1) | 0.73 (0.8) | 0.65 (0.7) | | |
| | CLUTTER (#1) | | | 0.14 (0.8) | 0.11 (0.7) |
| | TARGETS (#2) | 0.98 (0.8) | 0.95 (0.7) | | |
| | CLUTTER (#2) | | | 0.28 (0.8) | 0.17 (0.7) |
| 10-CENTERS | TARGETS (#1) | 0.81 (0.8) | 0.75 (0.7) | | |
| | CLUTTER (#1) | | | 0.11 (0.8) | 0.07 (0.7) |
| | TARGETS (#2) | 0.87 (0.8) | 0.77 (0.7) | | |
| | CLUTTER (#2) | | | 0.14 (0.8) | 0.10 (0.7) |
| RANDOM | | | | | |
| 2-CENTERS | TARGETS (#1) | 0.77±0.03 (0.8) | 0.64±0.04 (0.7) | | |
| | CLUTTER (#1) | | | 0.17±0.06 (0.8) | 0.10±0.06 (0.7) |
| | TARGETS (#2) | 0.95±0.07 (0.8) | 0.92±0.07 (0.7) | | |
| | CLUTTER (#2) | | | 0.37±0.10 (0.8) | 0.22±0.10 (0.7) |
| 10-CENTERS | TARGETS (#1) | 0.76±0.02 (0.8) | 0.61±0.03 (0.7) | | |
| | CLUTTER (#1) | | | 0.18±0.02 (0.8) | 0.09±0.02 (0.7) |
| | TARGETS (#2) | 0.92±0.05 (0.8) | 0.92±0.04 (0.7) | | |
| | CLUTTER (#2) | | | 0.36±0.05 (0.8) | 0.21±0.05 (0.7) |

*FIG. 8*

ID NEURAL NETWORK CLASSIFIER, SYSTEMS AND METHODS

NOTICE

©Copyright, Texas Instruments Incorporated 1991. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

The following coassigned patent applications are hereby incorporated by reference as background and supporting information to the subject matter discussed

| Title | Application No. | FILING DATE |
|---|---|---|
| "Neural Compiler" | 07/698,647 | 05/10/91 |

FIELD OF THE INVENTION

The present invention relates generally to products and methods pertaining to pattern recognition and classification procedures, learning techniques, and neural networks.

BACKGROUND OF THE INVENTION

Target recognition and pattern classification involves the evaluation of new observations on the basis of past observations to distinguish targets or desired patterns from background clutter. This task is complicated by the complex and non-stationary nature of real world environments. Moreover, the computational overhead of many practical classification problems strain serial computer resources.

With respect to the inherent complexity of pattern classification problems, the nonstationary nature of many classification problems makes acquiring a representative data set for training a classifier difficult. The likelihood that the classification scheme would be able to recognize the desired pattern is small without representative training data. This robustness issue is central to pattern recognition solutions in radar identification, speech recognition, and automatic target recognition. In radar identification, parameters describing a radar emitter vary dramatically, as warring parties deliberately change the frequencies and pulse repetition intervals from their peace-time values to disguise the identity of the emitter. In speech recognition, the meanings and sounds of words and phrases change as a function of the culture (or dialect), speaker, or context. In the automatic recognition of targets, targets exist in a vast array of settings, lighting conditions, times of the day and year, orientations, and positions.

With respect to the computational requirements, neural networks provide parallel computational implementations. These networks embody an approach to pattern recognition and classification based on learning. Example patterns are used to train these networks to isolate distinctions between the particular patterns and background clutter for proper classification.

In particular, D. F. Specht in the article "Probalistic Neural Networks and the Polynomial Adaline as Complementary Techniques for Classification," *IEEE Transactions on Neural Networks*, vol. 1, pp.1 111–120 (1990) discussed the straightforward implementation or mapping of a Parzen estimator the probabilistic neural network into a neural network architecture. His implementation required the network size to be large enough to accommodate all training points such that there is a one-to-one correspondence between the number of nodes in the hidden layer of the network and the number of training points. Specht discusses one approach, the Polynomial Adaline, to reduce the size of the network. In particular, he stated:

The training rule for the polynomial Adaline is derived through a Taylor's series expansion of the PNN decision boundary expressed in terms of sums of exponentials . . . . The result is a general polynomial that describes the decision surface in multidimensional measurement space, and an algorithm for calculating the coefficients of the polynomial based on the training samples . . . . In large, mature applications in which the advantages of economy of hardware and testing speed justify the effort required to select the coefficients which are significant for a particular application, the Padaline is a better choice.

He also noted "the effort required to select the coefficients are significant for a particular application." Moreover, his method does not address the more general problem of mapping any statistical classifier into a parallel architecture.

SUMMARY OF THE INVENTION

This application discloses a method of and system for parallelizing an program, comprising the steps of inputting an algorithm, operating the algorithm on selected data inputs to generate representative outputs, inputting representative outputs into parallelizing algorithms, and outputting a parallel implementation of the inputted algorithm. In particular, this provides a parallel framework for target classification and pattern recognition procedures. The advantages of this system are its extension to algorithms and functions that cannot be easily parallelized. Moreover, training the neural network to embody a particular algorithm does not suffer in this case from lack of training data: there are no limitations on the size of the training set, as the representative input data and respective outputs can be varied.

For example, in the preferred embodiment, a classification algorithm, such as a Parzen Classifier, is inputted into the parallelizing system. The parallelizing system then operates the inputted algorithm on selected data inputs representing real-world environments to generate representative outputs. These representative outputs characterize the operational characteristics of the inputed algorithm and are used by a parallelizing algorithms, which include neural network learning procedures, to develop a parallel implementation, such as a neural network, of the inputed algorithm. In addition, the preferred embodiment also utilizes data compression procedures, such as "Infomax", to simplify the parallelizing operations.

BRIEF DESCRIPTION OF THE DRAWINGS

Further features and advantages will become apparent from the following and more particular description of the various embodiments of the invention, as illustrated in the accompanying drawing, wherein:

FIG. 4 is an illustration of the "Infomax" scheme.

FIG. 6 is a table of alternative embodiments of the claimed invention suggested in terms of the inputted algorithms and the number of classes involved.

Table 1 shows Image Data Set.

Table 2 shows results for 1-Class Classifiers: Target fractions appear under $P_d$ and $P_{fa}$ in parentheses.

Table 3 shows results for 2-class classifiers.

DETAILED DESCRIPTION OF THE PREFERRED EMBODIMENTS

Robust pattern recognition and target classification problems and applications generally attempt to distinguish preferred targets from background clutter.

Figure 1:
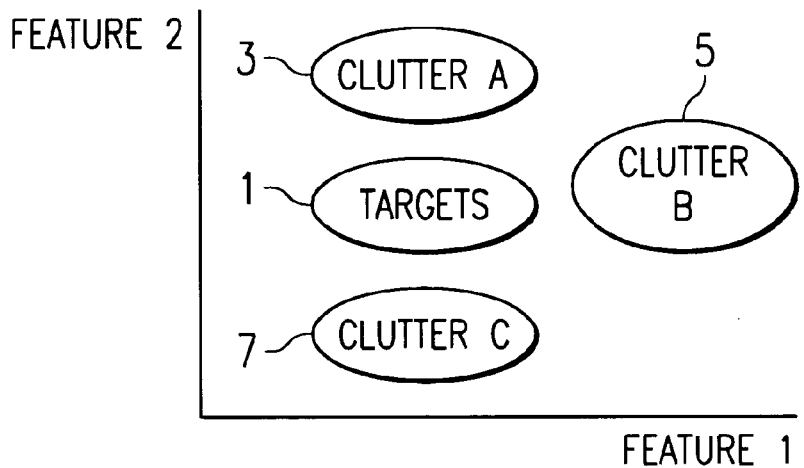
FIG. 1 is a representation of the target and background clutter in a feature space.

As shown in FIG. 1, Target 1 and Clutter A 3, Clutter B 5, and Clutter C 7 may be described by a corresponding feature set $F=(f_1, f_2, \ldots f_n)$.

As shown in FIG. 1, if the features are chosen correctly, Target 1 and Clutter A 3, Clutter B 5, and Clutter C 7 converge on different locus locations in the feature space F. These locations or groups correspond to classes in the classification context. Target 1 and Clutter A 3, B 5, and C 7 are not necessarily stationary in real-world environments. As the environment varies, targets and background clutter vary independently or jointly from other targets or background clutter. Alternatively, the target representation may be stationary when the clutter is not and vice versa.

Given the differences between the Target 1 and Clutter A 3, B 5, and C 7 in the feature space, a one-class, two-class, or multiple-class classifier may be designed and implemented. In turn, these procedures often require large amounts of data and large numbers of calculations, which often require parallel implementations. One type of parallelizing algorithms are learning algorithms and one type of parallel implementations are neural networks.

Figure 2:
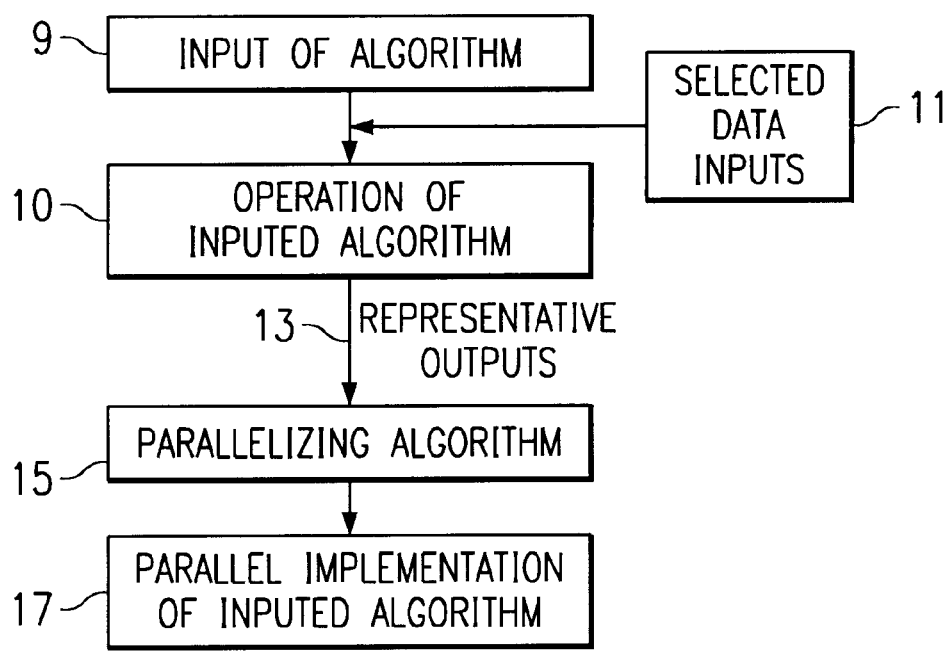
FIG. 2 is the disclosed parallelizing system configuration.

FIG. 2 shows a parallelizing system diagram of the proposed invention. This system configuration entails the input of an algorithm 9 into the system, which receives the inputted algorithm, operates the inputted algorithm with selected data inputs 11 representing real-world environments to generate representative outputs 13. These representative outputs 13 characterize the operational characteristics of the inputed algorithm and are used by a parallelizing algorithm 15, such as a learning algorithm, to develop a parallel implementation 17, such as a neural network, of the inputed algorithm. As a result, the parallelizing system operates the inputed algorithm on preselected data representing real-world environments and generates corresponding outputs. These corresponding outputs are then inputted into a parallelizing algorithm to generate the corresponding parallel embodiment, which emulates the functionality of the inputted algorithm.

In the preferred embodiment, a statistical one-class classifier, which incorporates target statistics to distinguish and isolate the target regions from background clutter, is inputed into the parallelizing system. This type of classifier has been found to be particularly effective when the target representation is stationary and the clutter representation is not. In particular, the preferred embodiment inputs a Parzen estimator to approximate the underlying density of target points to determine the class output. The Parzen estimator for the probability density P has the form:

$$P = \sum_{i=1}^{N} k(|\vec{x} - \vec{x}_i|, \sigma) \quad (1)$$

where the sum is over the training set and the kernel function k for our application is:

$$k(x, \sigma) = \frac{1}{\sigma} \frac{1}{1 + \left(\frac{x}{\sigma}\right)^2}$$

The Parzen estimator approaches the true probability density, provided: (1) the product of the width of the Parzen kernel function and the number of training points approaches infinity and (2) the width of the kernel function approaches zero. The distance $|\vec{x} - \vec{x}_i|$ is the Euclidean distance between points in the feature space F. After P is constructed, we use other target points to set a threshold T, such that the probability density values for some fraction of target points lie above T. All points in the feature space with threshold T define a discriminant surface between target and clutter points. As with other classifier implementations, the speed and memory requirements of the Parzen estimator vary directly with the size of the input data (each data point is stored and then recalled during testing), which are a concern in most implementations.

Next, the preferred embodiment of the parallelizing system operates the inputted classifier algorithm on a preselected representative data base to generate corresponding outputs, which effectively generates a set of ordered pairs $((x1, \ldots, xn), y=f(x1, \ldots, xn))$. Next, parallelizing procedures, such as learning procedures, utilize these outputs to generate the corresponding parallel network, such as a neural network, to emulate the functionality of the inputted algorithm.

This practice of training the neural network to learn the function defined by the inputted algorithm, the Parzen estimator, has advantages over training the neural network on the data inputted into the algorithm directly. The advantages of this system are its extension to algorithms and functions that cannot be easily parallelized. Moreover, training the neural network to embody a particular algorithm does not suffer this case from lack of training data: there are no limitations on the size of the training set, as the representative input data and respective outputs can be varied. The original data set does not include any examples of clutter, because these examples are actually generated by the inputted algorithm. Since the network is learning a specific function, there are no limitations on the size of the training set, as the representative data can be varied. Moreover, the Parzen estimate of the probability density function sets well-defined and understood boundaries on the performance of the network, which vary as a function of the desired accuracy, the size of the data base, and the number of hidden neurons.

Figure 3:
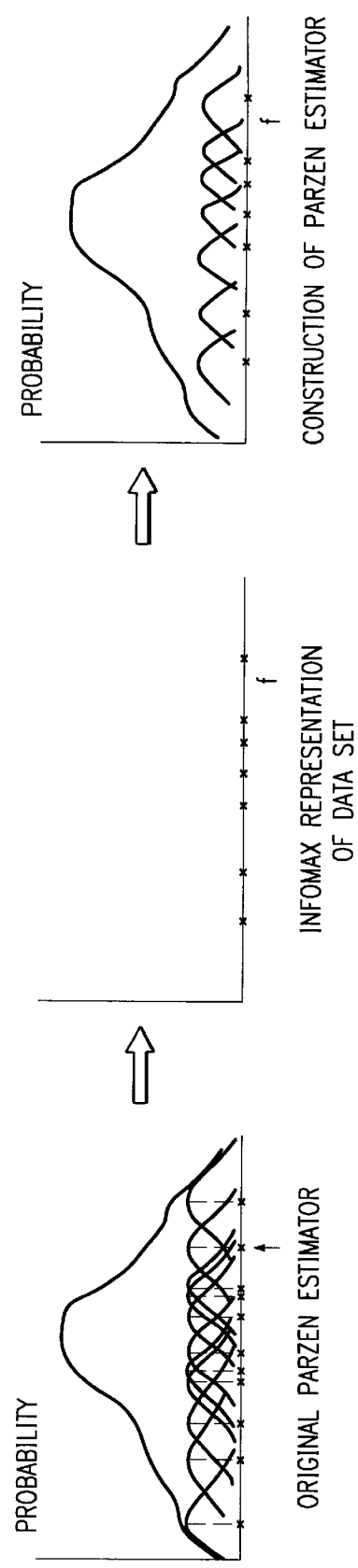
FIG. 3 is an illustration of the "Infomax" data compression scheme that reduces the number of data points used to construct the Parzen estimator and the transformation into the neural network framework in the preferred embodiment.

The preferred embodiment next uses data compression schemes to reduce the number of data points used to construct the Parzen estimator in addition to neural network implementation procedures as shown in FIG. 3. These procedures are included in the parallelizing step of the functional system configuration shown in FIG. 2. These neural network learning schemes determine a set of points that reflects the probability density of the full data set. The preferred embodiment uses the "Infomax" method developed by R. Linsker, who published his findings in R. Linsker, "How to generate ordered maps by maximizing the mutual information between input and output signals," *Neural Computation*, vol. 1, no. 3, pp.402–411, 1989. FIG. 4 illustrates this method. This method satisfies the equiprobability condition under certain circumstances (that is, the configuration of the set of points determined by the infomax principle is consistent with the probability density of the full data set), has no free parameters, and arises from a well-defined information maximization principle. Input layer L represents the n-dimensional parameter space of the data set. The output cells or neurons in layer M typically receive inputs from a localized region in the L space, which is characterized by a length scale $\lambda_L$. We assume that interactions between cells in L and M are small beyond $\lambda_L$. Associated with each neuron $M_0$ in layer M is a point $$\bar{x}(M_0),$$

which is an n-dimensional vector in the input space L. The points $$\bar{x}(M_0),$$

serve as the centers $$\bar{x}_i$$

in the Parzen estimator, equation (1). If the number $N_M$ of neurons in M is smaller than the number of data points $N_L$ in the training set, then we achieve an $N_M/N_L$ compression in the data representation. We require a method to move the centers $$\bar{x}(M_0),$$

to positions in L-space that are consistent with the density of input patterns.

Linsker defines a gradient-descent algorithm to move the centers $$\bar{x}(M_0),$$

so as to maximize the Shannon information rate $$R \equiv P_L(L) \int dM P(M|L) \log [P(M|L)/P_M(M)]$$

where $P_L(L)$ is the probability density of the input patterns, $P(M|L)$ is the probability of activating the output neuron M given input pattern L, and $$P_M(M) \equiv \int dL\ P_L(L) P(M|L)$$

The gradient-descent algorithm for shifting the ith coordinate $$X_i(M_0) \text{ of } \bar{x}(M_0)$$

is simply:

$$\Delta[X_i(M_o)] = -\varepsilon \frac{\partial R}{\partial [X_i(Mo)]}, \text{ where } \varepsilon \ll 1.$$

Following Linsker, we write the information rate R as a sum of two terms, R=R1+R2, where $$R_1 = -\int dM\ P_M(M) \log P_M(M)$$

$$R_2 = \int dL\ P_L(L) \int dM\ P(M|L) \log P(M|L).$$

The first term, which is the entropy of the probability density $P_M(M)$, is maximized when $P_M(M)=1/N_M$; that is, the average activation level for each M neuron is the same. The preferred embodiment equates $$\bar{x}(M_0)$$

in L space with the density of the input patterns and allows only one M neuron to be active with each input to achieve uniform activation. An alternative embodiment to realize a uniform mean activation places all $$\bar{x}(M_0)\text{'s}$$

at the same point in L space.

The second term $R_2$ is repulsive in nature and prevents points from occupying the same point in L space. $R_2$ is maximized when each of the M neurons responds to a unique set of inputs from L space, so that P(M|L) is either near 0 or 1. If we allow excitatory interactions between the neurons in M space, then clusters of neurons of some characteristic size $\lambda_M$ will respond to similar input patterns.

The terms $R_1$ and $R_2$ together lead to a configuration of centers $$\bar{x}(M_0)$$

that reflect the probability density of the input patterns $P_L(L)$, which is evident if the centers in L space are distributed according to $P_L(L)$. This distribution maximizes both $R_1$ and $R_2$ if $\lambda_L$ is smaller than the smallest intra-center distance measured in L. In that case, the mean activation level of the neurons in M is uniform and each neuron M receives activation from a unique region in L.

In the actual implementation for experiments, described infra, $\lambda_M \rightarrow 0$, which implies that the excitatory function $G(M_0, M_0')$; between two neurons, $M_0$ and $M_0'$, in M is proportional to $(M_0-M_0')$. The feedforward activation function is defined as that is, the $$A(L,M) \text{ as } A(L,M)=k(|\bar{x}(L_0)-\bar{x}(M_0)|,\sigma)$$

interaction between a cell at $$\bar{x}(L_0)$$

in the input space L and a cell in M with center location $$\bar{x}(M_0)$$

is expressed by the Parzen kernel function. The characteristic length $\lambda_L$ is, therefore, the cutoff parameter $\sigma$. All nearest-neighbor distances between input patterns are larger than the cutoff length $\sigma$, and, hence, we conclude that $\lambda_L$ is smaller than the smallest intra-center distance. With the above definitions of $G(M_0, M_0')$, the probability density $$P(M \mid L) \text{ becomes: } P(M \mid L) = A(L, M) \Big/ \sum_{M'} A(L, M').$$

We then obtain the incremental learning rule from R. Linsker, "How to generate ordered maps by maximizing the mutual information between input and output signals," *Neural Computation*, vol. 1, no. 3, pp. 402–411, 1989, which is as follows $$\Delta[x_i(M_0)] = \frac{1}{K} \sum_{j=1}^{k} Z_i(L_j, M_0) \qquad (2)$$

$$\text{with } Z_i(L_j, M_0) = [\partial A(L_j, M_0)/\partial x_i(M_0)] \left[ \sum_{M'} A(L_j, M') \right]^{-1} \times$$

$$\sum_{M} \{ [\log P(M \mid L_j) - \log P_M(M)] $$

Here K is the number of points in the training set and the sum over j is over the training set.

Figure 5:
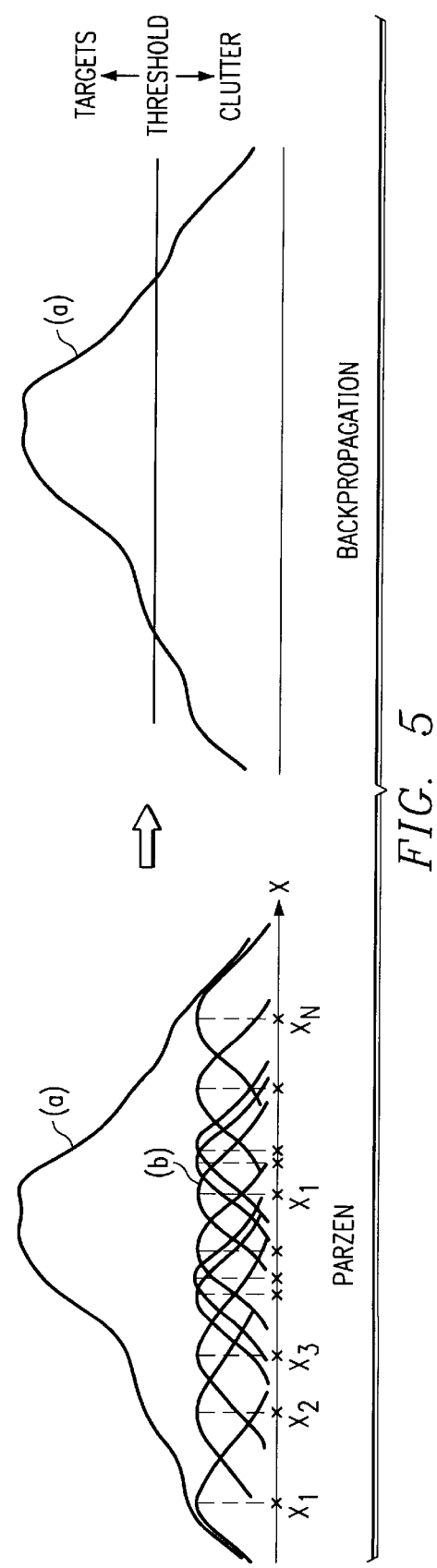
FIG. 5 is an illustration of the process of developing a feed-forward network trained with the backpropagation learning algorithm.

An alternative embodiment learns the probability density function given by Equation (1) using a feed-forward network trained with the back-propagation learning algorithm, which is well known in the art and shown in FIG. 5. In particular, this stage maps the feature space to the binary class output-target or clutter. The probability density function must be approximated to some desired level of accuracy while ensuring that the number of hidden nodes, $n_h$, is sufficiently less than the number of points in the training set, N, $n_h \ll N$. In the limit that N approaches infinity, the ratio $n_h/N$ must approach 0 sufficiently fast to avoid the memory dilemma posed by the Parzen estimator. Accurately approximating the discriminant surface defined by the Parzen estimator with a small number of sigmoid functions will circumvent the memory problems associated with this application, mentioned supra.

This alternative embodiment relies on the function approximation properties of feed-forward neural networks with fixed threshold functions. It is well known in the art that a feed-forward neural network (one hidden layer) with arbitrary squashing functions can approximate any Borel measurable function to arbitrary accuracy provided a sufficient number of hidden units are present to represent the function, but this knowledge does not define methods for setting the network weights or for determining the appropriate number of hidden units. While the backpropagation algorithm does not guarantee a solution to the weight assignment problem, it yields good solutions in a number of contexts.

For training, back-propagation requires examples from each class, targets and clutter. Thus, target information alone is insufficient. This alternate embodiment generates a training set by selecting points at random from the region of feature space F bounded by the minimum and maximum values of the feature coordinates for the set of target training points. As discussed, supra, the Parzen estimator is used to designate the class of each training point. This selection procedure ensures the training set contains points near the discriminant surface. Discriminant surfaces are commonly referred to as boundaries or boundary points between target and clutter points and are the most difficult ones for the network to learn to classify.

FIG. 6 is a table of alternative embodiments of the claimed invention suggested in terms of the inputted algorithms and the number of classes involved. Alternative embodiments could also employ other parallelizing techniques that produce other parallel implementations. In particular, Infomax algorithms are generally regarded to be a subset of a larger class of compression algorithms known as competitive learning algorithms, which are in turn members of and even larger class of vector quantization techniques used to compress data. For instance, radial basis functions, which were discussed in M. Niranjan and F. Fallside, "Neural Networks and radial basis functions in classifying static speech patterns, "CUED/FINFENG/TR. 6, submitted to *Computer Speech and Language*, could be used in place of the infomax procedures as could Kanerva Sparse Distributed Memory discussed in P. Kanerva, *Sparse Distributed Memory*, Cambridge, Mass.: MIT Press, 1988 and D. Rodgers, "Statistical prediction with Kanerva's sparse distributed memory," in *Neural Information Processing Systems*, David S. Touretzky, Ed., San Mateo, Calif.: Morgan Kaufmann, 1989.

Other unsupervised techniques could be used as well. Similarly, backpropagation is a member of a larger class of gradient descent learning techniques. Reduced Coulomb Energy procedures, which were discussed in C. L. Scofield et al., "Pattern class degeneracy in an unrestricted storage density memory," in *Neural Information Processing Systems*, Dana Z. Anderson, Ed., New York: AIP, 1988, could be used in place of the backpropagation learning techniques. Other supervised learning techniques could be used as well. Alternate classifying techniques may be inputed as well, including both parametric and nonparametric techniques. Thus, while the preferred embodiment and additional embodiments of the invention have been disclosed, it should be understood that many changes in detail may be made as a matter of engineering choices without departing from the spirit and scope of the invention, as defined by the appended claims. In particular, alternate procedures that share the same functionality as the procedures discussed, supra, are plainly within the scope of the invention. Similarly as discussed, the invention may be implemented in hardware or software or both. These parallel implementations can be optimized as well The inventor has conducted numerous experiments demonstrating the effectiveness of these techniques. With respect to the inputed image data, the data are two sets of near-Infra Red images (190 pixels×210 pixels). Table 1 presents the approximate number of images in each image set and a brief scene description. The extraction of features from the images requires considerable image preprocessing, which was performed with conventional algorithms. The first preprocessing step identifies regions in the image with high probability of containing a target. This screening step reduces the overall processing time. In a second preprocessing step, features are extracted from the high-probability regions. Approximately thirty features were extracted from each high-probability region; nine of which were used of these features for classification. These nine features were chosen for classification based on training a backpropagation network on all 30 features and then ranking the features according to the magnitude of the weight vectors for each input feature node. The features were based on the power spectrum of the high-probability regions.

These experiments compared the results of a one-class Parzen classification scheme with a two-class Parzen classification scheme. In particular, the inventor constructed a one-class Parzen classifier using only target features from image set #1. (The parameter s was set to 0.01 for all applications of the Parzen classifier). The inventor used 129 points of the 206 target points in set #1 to build the Parzen estimator (these 129 points are the centers in the kernel function—see Equation (1)). Thirty-nine of the remaining target points were used to set the threshold for classification. These experiments tested the classifier on the 38 unused target points, 1227 clutter points from image set #1, 641 clutter points from image set #2, and 39 target points from image set #2. Test results are shown in Table 2 for both a target fraction of 0.7 and a target fraction of 0.8. The target fraction is the fraction of the 39 target points used to set the threshold with target probability above the threshold value.

Similarly, the inventor constructed a two-class Parzen classifier and a two-class multi-layer neural network classifier (trained with a conjugate gradient-descent version of the back-propagation learning algorithm) using target and clutter points from image set #1. Test results appear in Table 3. No test results appear for targets from image set #1 because all of the target points were used for training. The one-class classifier shows improvement over the two-class classifier with regard to classification of clutter in terms of the criterion $d=P_d-P_{fa}$ where Pd is probability of detection and $P_{fa}$ is false alarm rate.

The inventor also applied the methods described in the last section to reduce the memory or network size requirements of the Parzen one-class classifier. He used a multi-layer network trained with back-propagation to learn the discriminant function defined by the one-class Parzen estimator. The training set for the network was generated in the way described in the last section. Classification of training points was done with the Parzen one-class classifier (target fraction of 0.7). There were nearly 600 target points and 200 clutter points in the training set. Test results are presented in Table 2 for three network structures: 9×8×1, 9×16×1, 9×32×1 (A inputs×B hidden nodes×C outputs). Training involved approximately 500 learning cycles for each of the three networks and was stopped when the total error on the training set stabilized. Though this network had lower false alarm rates than the Parzen two-class classifier (and the false alarm rates comparable to those of the 2-class multi-layer network), the results were generally not as good as those obtained with the one-class Parzen classifier, as measured by $\Delta=P_d-P_{fa}$. The inventor also applied the "Infomax" optimization principle to approximate the Parzen estimator. Table 2 shows test results from (1) 10 center points (an approximately 13-fold reduction in the size of the original training set) and (2) 2 center points (an approximately 65-fold reduction in the size of the training set). Points were chosen at random from the complete training set and then moving the points according to the algorithm given in Equation 2. The results are comparable to those achieved with the original one-class Parzen estimator. Training points were also chosen at random from the complete training set and used these to construct the Parzen classifier without shifting the positions of the points. Results are given in Table 2. Results for the random classifier with 10 centers are similar to those for the 10-center infomax classifier. The error bars (which are the standard deviations over an ensemble of random training sets) for the random case are small, which indicates that the complete training set is well represented by 10 centers randomly chosen. The error bars are larger for the 2-center random classifier, which indicates that the results vary considerably with the initial random positions of the centers. Moreover, the average results for the 2-center random classifier are not as good as those obtained with the 2-center infomax classifier. Note the final positions of the centers in the infomax classifier were always the same (and, hence, no error bars are shown for the infomax results).

The values and ranges disclosed herein are given for a preferred embodiment of the present invention, of course these values may vary as the parameters are changed. Therefore it is to be understood that many changes in detail may be made as a matter of engineering choices without departing from the spirit and scope of the invention, as defined by the appended claims.

We claim:

1. A method of training a neural network classifier, comprising the steps of:
   (a) providing a first set of target points $Z_1, Z_2, \ldots Z_L$ in a feature space;
   (b) forming an estimated target probability density P on said feature space from said target points $Z_1, Z_2, \ldots Z_L$;
   (c) providing a second set of target points $W_1, W_2, \ldots W_M$ in said feature space;
   (d) defining a threshold T from the number of $W_j$ with $P(W_j)>T$ and the number of $W_j$ with $P(W_j)<T$;
   (e) providing a third set of points $X_1, X_2, \ldots X_N$ in said feature space, and forming a set of pairs $(X_j, Y_j)$ where $Y_j$ is "target" when $P(X_j)>T$ and $Y_j$ is "clutter" when $P(X_j)<T$; and
   (f) using the pairs $(X_1, Y_1), (X_2, Y_2), \ldots, (X_j, Y_j), \ldots, (X_N, Y_N)$ as input/output pairs to train a neural network classifier.

2. The method of claim 1, wherein:
   (a) said step (b) of forming an estimated target probability density includes compressing said set of target points $Z_1, Z_2, \ldots Z_L$.

3. The method of claim 1, wherein:
   (a) said step (f) of using pairs to train a neural network classifier includes backpropagation in said neural network.

4. The method of claim 1, wherein:
   (a) said step (b) of forming an estimated target probability density includes picking a probability density kernel k(Z) defined on said feature space and summing the translates of said kernel, $k(Z-Z_j)$, for all $Z_j$ in said first set of target points.

* * * * *